Dec. 23, 1958  R. J. WILLIAMS  2,865,428
VERTICAL ADJUSTABLE SEAT OPERATED BY JACK MECHANISM
Filed Sept. 8, 1953  8 Sheets-Sheet 1

INVENTOR.
Richard J. Williams.
BY
Barnes, Dickey & Pierce.
ATTORNEYS.

Dec. 23, 1958  R. J. WILLIAMS  2,865,428
VERTICAL ADJUSTABLE SEAT OPERATED BY JACK MECHANISM
Filed Sept. 8, 1953  8 Sheets-Sheet 3

INVENTOR.
Richard J. Williams
BY
Harness, Dickey & Pierce.
ATTORNEYS.

Dec. 23, 1958  R. J. WILLIAMS  2,865,428
VERTICAL ADJUSTABLE SEAT OPERATED BY JACK MECHANISM
Filed Sept. 8, 1953  8 Sheets-Sheet 6

INVENTOR.
Richard J. Williams
BY
Harness, Dickey & Pierce
ATTORNEYS.

Dec. 23, 1958  R. J. WILLIAMS  2,865,428
VERTICAL ADJUSTABLE SEAT OPERATED BY JACK MECHANISM
Filed Sept. 8, 1953  8 Sheets-Sheet 7

INVENTOR.
Richard J. Williams.
BY
Harness, Dickey & Pierce.
ATTORNEYS.

Dec. 23, 1958 R. J. WILLIAMS 2,865,428
VERTICAL ADJUSTABLE SEAT OPERATED BY JACK MECHANISM
Filed Sept. 8, 1953 8 Sheets-Sheet 8

INVENTOR.
Richard J. Williams
BY
Harness, Dickey & Pierce.
ATTORNEYS.

United States Patent Office 2,865,428
Patented Dec. 23, 1958

2,865,428

VERTICAL ADJUSTABLE SEAT OPERATED BY JACK MECHANISM

Richard J. Williams, Birmingham, Mich., assignor to American Metal Products Company, Detroit, Mich., a corporation of Michigan Application September 8, 1953, Serial No. 378,701

17 Claims. (Cl. 155—14)

This invention relates to seat tracks, and particularly to a seat supporting track for an automotive vehicle having a mechanism which is manually operated for raising and lowering the seat.

In the copending application of R. J. Williams et al., Serial No. 302,044, filed August 1, 1952, a seat mechanism is illustrated which is adjustable horizontally and vertically when operated by motor means.

The present invention pertains to a similar type of seat mechanism which employs a manually operated mechanism by which the seat may be raised or lowered. The mechanism embodies a sector plate having ratchet teeth which are engaged by pawls secured on a plate and actuated by an operating handle which permits the occupant to raise or lower the seat on its support.

Accordingly, the main objects of the invention are: to provide a seat which may be raised and lowered by the operation of a handle by the occupant of the seat; to provide a pair of swinging arms at the front and rear of the seat supporting structure which are interconnected to operate in unison and which are actuated by the oscillation of a handle to advance the teeth of a sector plate; to mount a seat supporting structure on a pair of swinging links which are retained in position by the engagement of detents with notches of a sector disk which may be raised and lowered by the manipulation of pawls operating on teeth of the disk which swing the links for raising or lowering the seat, and, in general, to provide a vertically adjustable seat with ratchet mechanism by which the seat may be raised and lowered by the occupant.

Other objects and features of novelty of the invention will be specifically pointed out or will become apparent when referring, for a better understanding of the invention, to the following description, taken in conjunction with the accompanying drawings, wherein:

Fig. 3 is a view of the structure illustrated in Fig. 1, providing a section as if taken on line 3—3 of Fig. 4;

Fig. 6 is an enlarged sectional view of the structure illustrated in Fig. 2, taken on the line 6—6 thereof;

Figure 4:
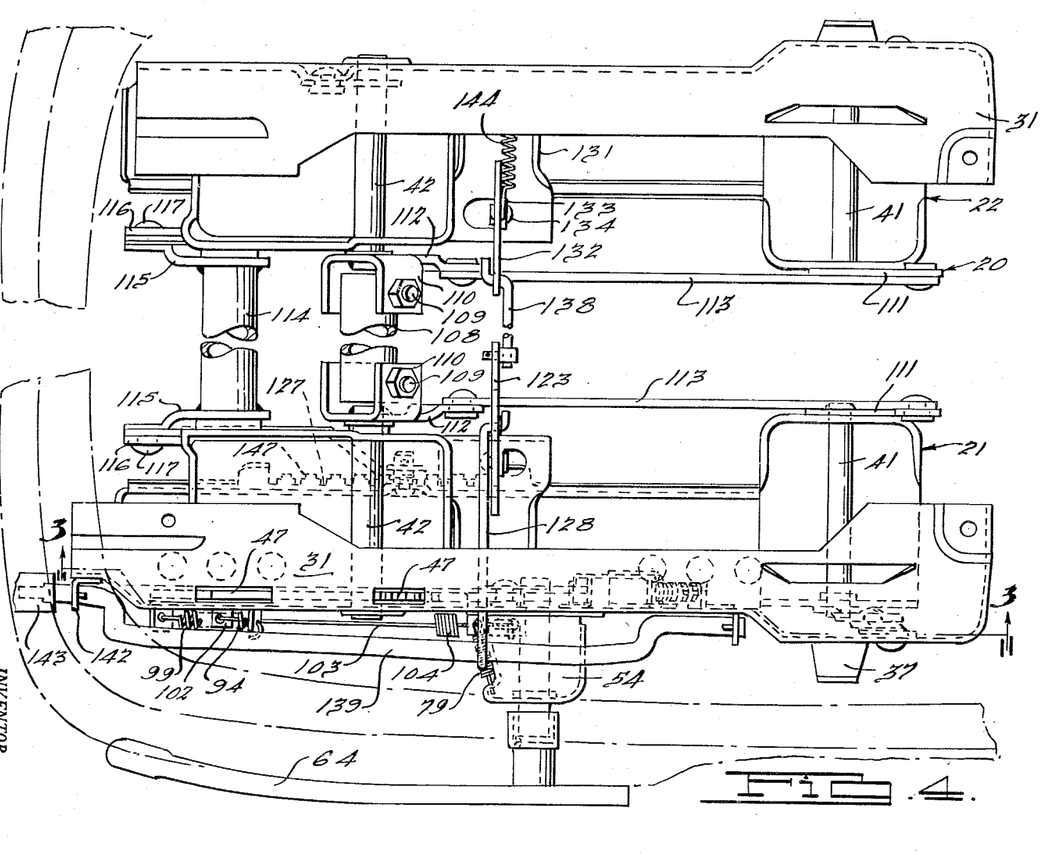
Fig. 4 is a broken plan view of the seat construction illustrated in Fig. 2.
Figure 5:
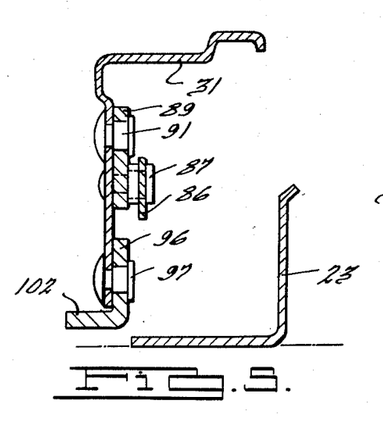
Fig. 5 is an enlarged sectional view of the structure illustrated in Fig. 2, taken on the line 5—5 thereof.
Figure 7:
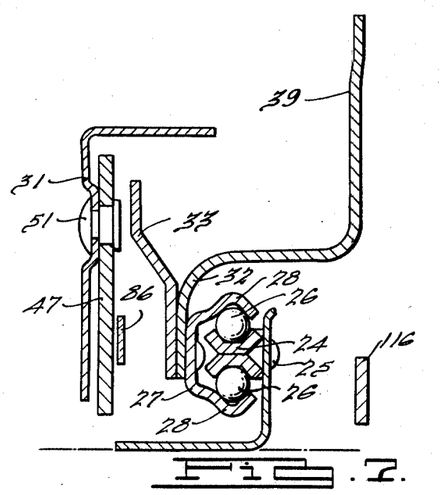
Fig. 7 is a sectional view of the structure illustrated in Fig. 2, taken on the line 7—7 thereof.
Figure 8:
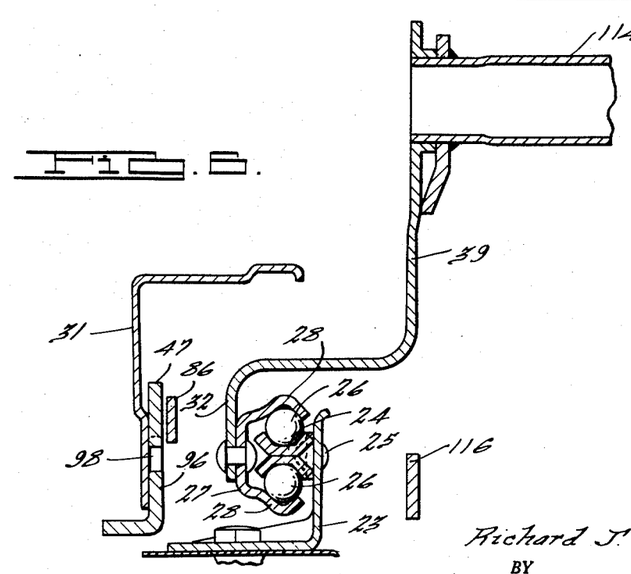
Fig. 8 is an enlarged sectional view of the structure illustrated in Fig. 2, taken on the line 8—8 thereof.

Referring to the figures, as will be more clearly illustrated in Fig. 4, the seat supporting structure 20 embodies a left-hand track element 21 and a right-hand track element 22 as viewed when in the vehicle. The two track elements are interconnected in a manner as will be described hereinafter, and are secured to a floor, herein illustrated as the floor of a vehicle. The two elements are substantially of the same construction except for right and left-hand disposition, and only those portions of the right-hand element will be described which differ from those of the left-hand element.

Referring to the figures, the left-hand track element 21 has an angle shaped base support 23 to which a pair of inverted channel elements 24 is secured by rivets 25. A plurality of balls 26 are locked to the inverted channel elements 24 by a channel element 27, the flanges of which are angularly disposed at 28 for encompassing the balls. The channel element 27 is horizontally movable on the base support 23 and supports all of the mechanism and the seat. An inverted angle member 31 supports the seat and is movable vertically relative to the channel member 27. At the forward end of the track element 21, a pair of upstanding brackets 32 and 33 are secured together and to the channel member 27 by welding and by a rivet 34. A stamping 35 is secured to the channel member 27 near the rear end thereof, as by a rivet 36, having an outwardly extending arm 37 projecting therefrom. A bracket 38 is welded to the bracket 35 opposite to the channel member 27. The brackets 35 and 38 extend upwardly at 39 and have a rod 41 journaled therein. Similarly, the brackets 32 and 33 extend upwardly at 39 and have a rod 42 journaled therein.

The rod 41 is welded to an arm 43, the opposite end of which is secured by a pivot 44 to a link 45 which is secured by a pivot 46 to the seat supporting angle member 31. The rod 42 has a sector plate 47 welded or otherwise secured thereto, the end 48 of the rod being shiftable within an arcuate slot 49 in the seat supporting angle member 31. The sector plate 47 is connected by a central pivot 51 to the angle-shaped seat supporting element 31, and when the rods 41 and 42 are rotated, the sector plate 47, arm 43 and link 45 will cause the seat supporting angle member 31 to be raised or lowered. It will be noted in this arrangement that the pivot 51 is below the rod 42 and that the pivot 44 is below the rod 41 when the seat is in the vertically adjusted position shown in Fig. 2 so that the pivots 44 and 51 will be moved substantially vertically when the rods 41 and 42 are rotated to provide the maximum degree of lift to the angle member 31 for the minimum amount of rotation of the rods 41 and 42. Since the pivots are on opposite sides of the rods, and since the pivots move on an arc about the rods, a lost motion connection must be provided and in the arrangement illustrated, this is accomplished by the additional link 45. The same effect could be produced by having the pivot 44 operate in a slot in the angle member 31. This construction is similar to that illustrated and described in the above mentioned patent application.

For producing the simultaneous actuation of the rods 41 and 42 for adjusting the seat elements vertically, a ratchet mechanism is provided which embodies ratchet teeth 52 on one portion of the sector plate 47 and latching notches 53 on another part of the sector plate. An outboard bracket 54 is provided on the angle element 31 in which a shaft 55 is supported, the opposite end 56 of the shaft being supported in an aperture in the angle member 31. A plate 57 is secured on the end 56 of the shaft 55. The shaft is retained in position by a bearing thrust ring 58 and a locking ring 59 which extends into an annular slot within the shaft. The outer end of the shaft 55 has a tubular extension 61 secured thereon by a pin 62, the square end 63 of which supports an operating handle 64 which is secured in position by a screw 65, threaded into a square plate 66 welded or otherwise secured within the square end 63. The plate 57 has a pawl 67 secured at one corner by a pivot 68, the lower adjacent corner having a pawl 69 secured thereto by a pivot 71. One edge 72 of the plate 57 abuts a blocklike stamping 73 which is retained for lengthwise movement by a strap 74 extending thereover and secured to the angle member 31. A spring 75 abuts the end of the block 73 and is retained in position by a finger 76 struck therefrom. One end of a Z-shaped element 77 extends into the opposite end of the spring, the opposite end being welded to the angle member 31. The blocklike stamping 73, acting upon the edge 72, returns the plate to inoperative position and retains the operating handle 64 in fixed position along the side of the seat.

A spring 78 bears against the pawl 67 and urges it in a counterclockwise direction, while a spring 79 secured to an outwardly directed flange 81 on the pawl 69 connected to the outboard bracket 54, urges the pawl 69 in a clockwise direction. The counterclockwise urging of the pawl 67 is limited by a finger 82 fixed to the angle element 31, while the pawl 69 is limited in its clockwise movement by a flange 83 extending from the angle element 31. A cam projection 84 on the pawl 67 causes the pawl to pivot about the finger 82 and move outwardly when the plate 57 is rotated counterclockwise to cause the end 85 to engage one of the ratchet teeth 52 and thereby cause the sector plate 47 to be advanced in a clockwise direction. A link 86 has one end secured on the pivot 71 to the plate 57 on the opposite side of the plate from that against which the pawl 69 is secured. The opposite end of the link is secured by a pivot 87 in a slot 88 in the link to a locking detent 89 which is secured by a pivot 91 to the angle member 31. The slot permits the counterclockwise movement of the plate 57 when the detent 89 has its end 92 engaged in one of the notches 53 of the sector. The detent 89 has an arm 93 extending at right angles thereto containing an aperture in which one end of a spring 94 is secured, the opposite end of the spring being secured in an aperture in a tongue 95 struck from the angle element 31. The spring 94 urges the detent 89 into locking relation with a notch 53 and prevents the clockwise movement of the sector plate 47. A second detent 96 is pivoted on the member 31 by a pivot 97. The detent 96 has an end 98 which is engageable with a notch 53 for the purpose of preventing the counterclockwise movement of the sector plate 47. A spring 99 connected to the extension 101 of the element 31 urges the detent 96 into engagement with a notch 53. A flange 102 extends outwardly from the detent 96 and secures one end of a wire 103 having a coil spring portion 104 and an end portion 105, the latter of which is secured to the outwardly extending flange 81 of the pawl 69 for operation in a slot 106 therein. The slot permits a lost motion connection between the pawl 69 and the detent 96 before the spring portion 104 is tensioned sufficiently to overcome the tension of the spring 99. This permits the detent 96 to be rocked in a counterclockwise direction when the shaft 55 is initially rotated in a clockwise direction. Thus, it will be seen that the detent 96 will be moved to unlatched position when the shaft 55 is rotated in a counterclockwise direction. When the shaft is rotated in a clockwise direction, the link 86 engaging the pin 87 moves the detent 89 to unlatched position.

Figure 1:
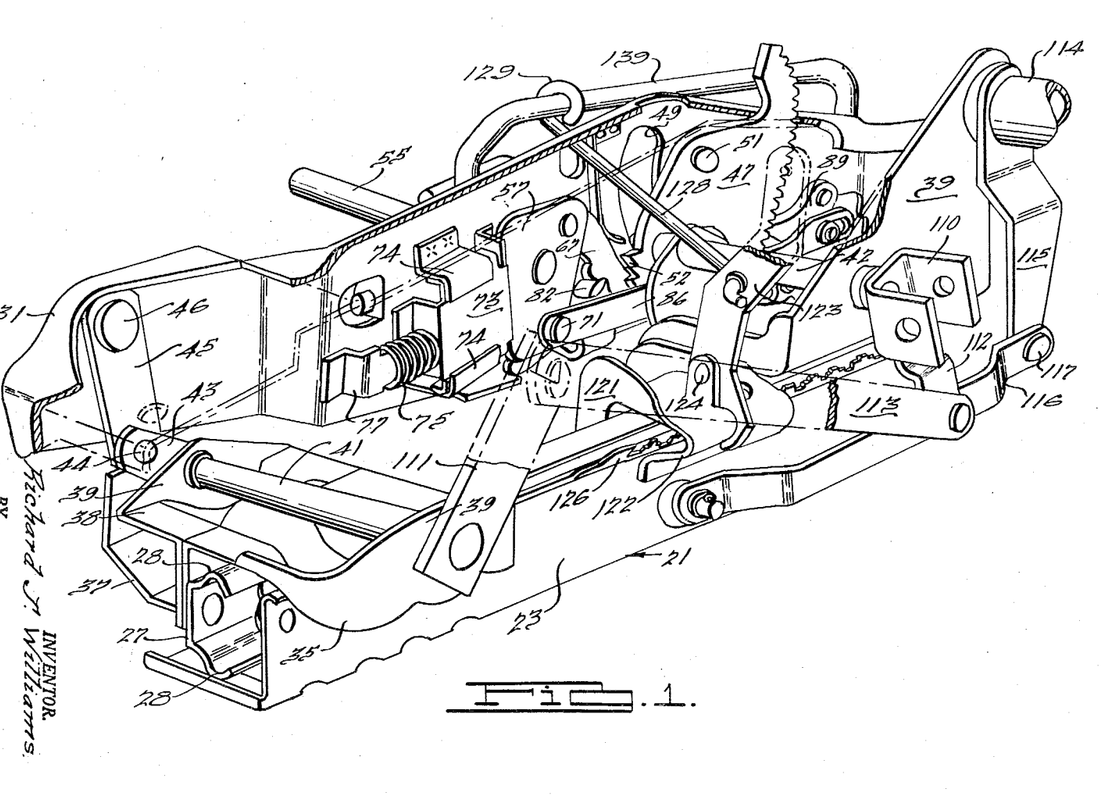
Figure 1 is a perspective view of a seat, supporting one of the pair of seat supporting tracks of the present invention, with parts in section and broken away.
Figure 2:
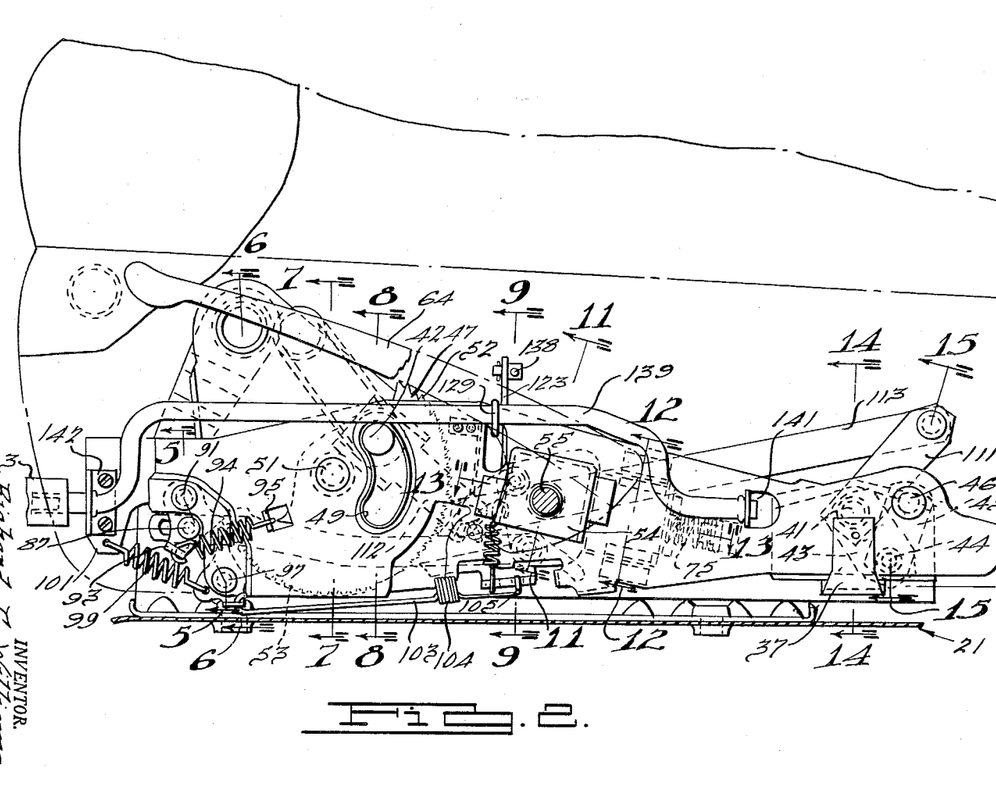
Fig. 2 is a view in elevation of structure illustrated in Fig. 1, as viewed from the inside thereof.

The pawl 69 ratchets the sector plate 47 in a clockwise direction for raising the seat supporting element 31. Upon the initial movement of the handle 64 upward from neutral position, as illustrated in Fig. 2, the shaft 55 is rotated in a clockwise direction and the pivot 71 of the pawl 69 moves upwardly and to the left so that the end of the pawl engages a tooth 52. This movement is controlled by the spring 79 and the finger 107 on the rear end of the pawl which is retained in engagement with the projecting finger 83. This initial movement advances the link 86 and moves the detent 89 from a notch 53. Upon the continued upward movement of the handle, the pawl 69 operating in toggle relation with the plate 68 exerts a substantial force which advances the sector plate 47 clockwise, advancing one or more notches past the detents 96 and 89. Upon the downward movement of the handle to neutral position, the detent 96 engaging an advanced notch 53, retains the sector plate 47 in advanced position while the pawl 69 returns to its initial position. When the handle 64 is again moved upwardly, the end of the pawl 69 advances into engagement with another tooth 52, and the further upward movement advances the sector plate in the manner as pointed out above. The like continued upward and downward movement of the handle 64 from neutral position produces the rotation of the sector plate 47 and the arcuate swinging movement of the pivots 51 and 46, which raises the member 31 relative to the channel element 27.

When it is desired to lower the member 31 and the seat, the handle 64 is moved downwardly from neutral position, causing the end 85 of the pawl 67 to move outwardly into engagement with a tooth 52 of the sector plate 47 as the cam portion 84 moves over the finger 82 to produce a slight clockwise movement to the sector plate 47. The movement of the pawl 69 to the right applies a tension to the spring portion 104 of the wire 103. The tension in the spring 104 rotates the detent 96 in a counterclockwise direction when the aforesaid slight clockwise movement of the sector plate 47 releases the pressure from the end 98 of the detent. By removing pressure from the handle and permitting it to move upwardly as the sector plate 47 moves counterclockwise due to the weight on the seat, the wire 103 is released, collapsing the spring portion 104 and permitting the detent 96 to move in a clockwise manner into engagement with a different notch 53 from the one from which it was released. The raising of the handle to neutral position releases the end 85 of the pawl 67 from engagement with a tooth 52 and permits the pawl to move downwardly when the handle is moved downwardly and to engage another tooth. The engagement of the tooth releases the pressure on the detent 96 which will be moved in a counterclockwise direction by the tension of the spring portion 104 produced by the pull on the wire 103. When the handle is again raised, the sector plate 47 moves further in a counterclockwise direction and further lowers the member and seat. In this manner, by applying downward pressure to the handle at the end of each increment of downward movement, the member 31 and seat may be lowered by steps produced by the passage of at least one tooth past the pawl end 85.

The raising and lowering mechanism is applied only to the left-hand seat track, and the handle 64 will be operated by the left hand of the driver of the vehicle. To connect the mechanism to both track members, the shafts 42 thereof have U-shaped bosses 110 on their aligned facing ends. A tubular force applying bar 108 is supported between the U-shaped bosses 110 and rigidly secured thereto by suitable means, herein illustrated as by bolts 109. Sufficient strength is provided by the U-shaped bosses 110 and bar 108 to have the seat supporting element on the track member at the right-hand side of the automobile controlled by the mechanism above described provided on the left-hand track member. The shaft 41 has an arm 111 secured in fixed relation thereto and the shaft 42 has an arm 112 fixed thereto. A connecting link 113 is pivoted to the ends of the arms 111 and 112 to cause the shaft 42 to operate in a counterclockwise direction when the shaft 41 is operated in a clockwise direction.

A torsion bar 114 is mounted on the upwardly extending brackets 39 for pivotal movement relative thereto. Each end of the bar has an arm 115 extending downwardly therefrom and secured to the end of a link 116 by a pivot 117, the opposite end of the link 116 being secured by a pivot 118 to the angular floor engaging element 23. The link 116 and the arm 115 maintain the members 31 in aligned relation at opposite sides of the seat when the channel elements 27 are moved longitudinally of the vehicle.

Figure 9:
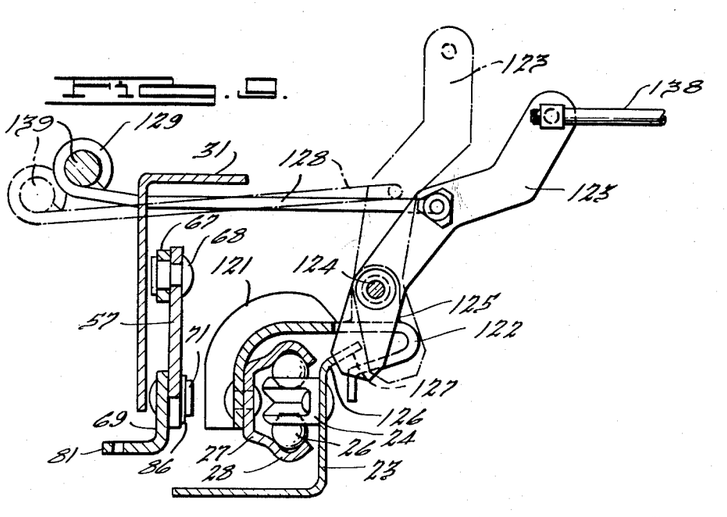
Fig. 9 is an enlarged sectional view of the structure illustrated in Fig. 2, taken on the line 9—9 thereof.
Figure 10:
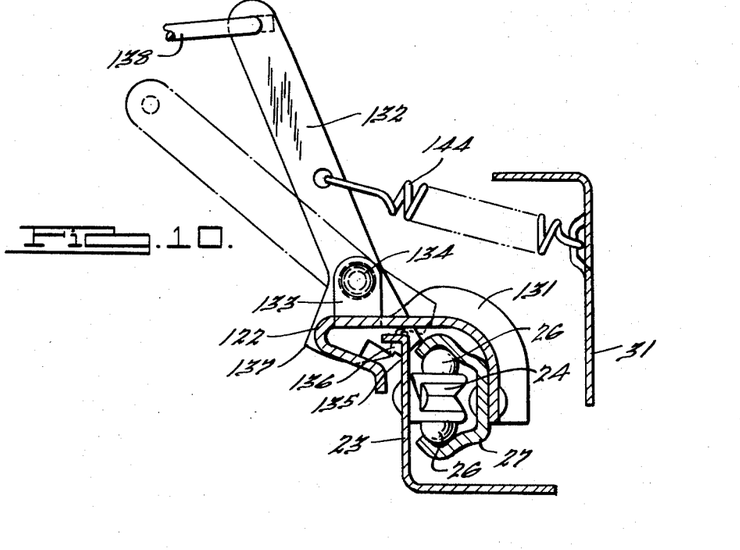
Fig. 10 is a view of structure, similar to that illustrated in Fig. 9, as provided on the opposite track element.
Figure 11:
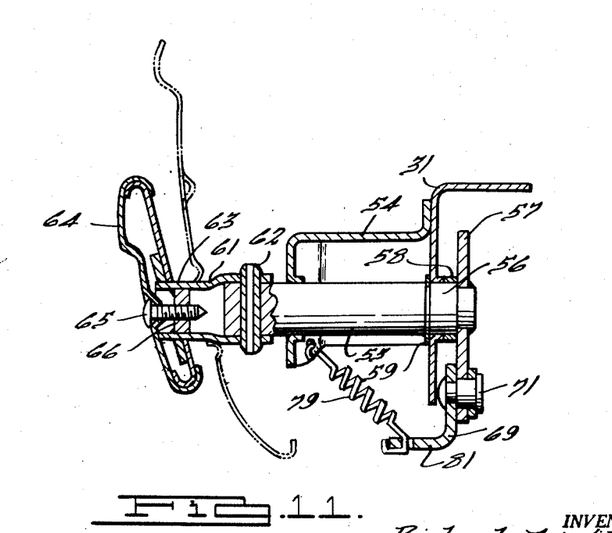
Fig. 11 is an enlarged sectional view of the structure illustrated in Fig. 2, taken on the line 11—11 thereof.
Figures 12, 13:
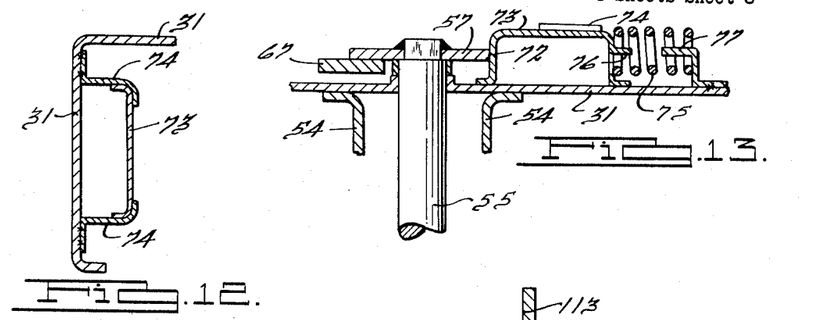
Fig. 12 is an enlarged sectional view of the structure illustrated in Fig. 2, taken on the line 12—12 thereof.
Fig. 13 is an enlarged sectional view of the structure illustrated in Fig. 2, taken on the line 13—13 thereof.
Figure 14:
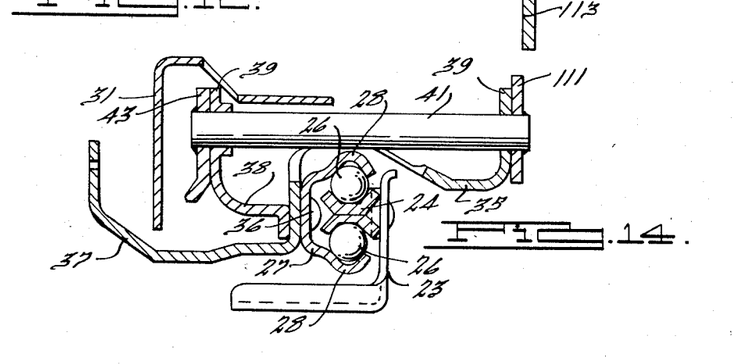
Fig. 14 is an enlarged sectional view of the structure illustrated in Fig. 2, taken on the line 14—14 thereof.
Figure 15:
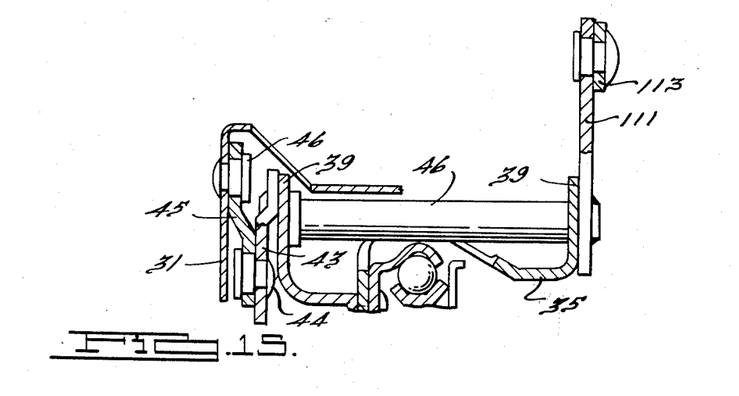
Fig. 15 is an enlarged sectional view of the structure illustrated in Fig. 2, taken on the line 15—15 thereof.

As illustrated in Figures 9 and 10, the left-hand track element 21 has a bracket 121 secured to the channel member 27, having a forwardly projecting reversely bent portion 122 containing a slot in which a locking lever 123 operates when secured by a pivot 124 to an upwardly extending struck-out tongue 125. The angle supporting member 23 has the upper portion flanged outwardly at 126 and provided with a plurality of notches 127. The notches receive the end of the locking link 123 and thereby maintain the channel element 27 locked to the angle element 23. An operating rod 128 is secured to the link 123 and extends through a vertically extending slot in the seat supporting element 31, the end of the rod 128 being reversely bent to form an eye 129.

A bracket 131, similar to the bracket 121, is secured to the channel member 27 of the right-hand track element 22. A locking link 132 is secured to an upwardly struck-out tongue 133 of the bracket by a pivot 134. The angle element 23 has slots 135 in the upper edge thereof in which the end 136 of the locking link 132 projects when in locking relation, as shown in full line. The counterclockwise movement of the link 132 moves the end 136 from the slot and permits the adjustment of the channel element 27 relative to the angle element 23. A projecting portion 137 of the link 132 operates in a slot in the projecting portion 122 of the bracket 131 to prevent any undue strain being applied to the finger 133 when the end 136 is in locked position.

A wire 138 is pivoted between the links 132 and 133 for causing the simultaneously operation of the links to latched and unlatched positions. The seat supporting element 31 has a formed rod 139 pivoted thereto on brackets 141 and 142. The rod 139 extends through the eye 129 of the rod 128 and a handle 143 is provided on the forward end for rotating the rod 139 in the brackets 131, 142 which, due to the crank effect thereof, produces the outward movement of the eye 129 and the movement of the links 123 and 132 into unlatched position. A spring 144 moves the links 123 and 132 into latched position when the handle 143 is released. It will be noted in Fig. 4 that the notches 127 are widened at the top at 147 to assure the engagement of the link 123 with a notch when the handle is released. When in this position, the adjustment of the seat forwardly or rearwardly will cause the link to drop within a notch 127.

Thus, it will be seen that a seat supporting structure is provided, made up of right and left-hand elements which are interconnected in such manner that the seat may be adjusted forwardly and rearwardly or vertically, upwardly and downwardly. A ratchet mechanism is provided for raising and lowering the seat, applied to the left-hand track member when viewed from seated position in the vehicle, with rigid interconnecting means between the track elements so that the single operating mechanism will operate and maintain both track elements in adjusted position. Similarly, a torsion bar is provided interconnecting the forwardly and rearwardly moving channel elements with the supporting angle elements so as to maintain the seat normal to the vehicle longitudinal axis in all positions of adjustment. When it is desired to move the seat forwardly and rearwardly, a handle at the front left-hand corner of the seat is raised to unlatch the locking mechanism so that adjustment fore and aft may be made. When it is desired to raise or lower the seat, the operating handle is actuated in a vertical plane upwardly and downwardly above or below its neutral position. When the handle is raised and lowered above its neutral position, the seat is raised. When lowered and raised below its neutral position, the seat is lowered. With this arrangement, the seat is jacked up or down in small increments so that a very accurate adjustment in height may be obtained.

What is claimed is:

1. A track for supporting one side of a seat for fore and aft and vertical adjustment, said track comprising a first member, two spaced pivoted elements supported by said member one near the front the other near the rear thereof, link means fixed to one of said elements, a toothed sector secured to the other of said elements, a seat supporting member secured to said link means and sector which is vertically adjusted thereby, arms fixed to said elements, a bar interconnecting said arms to cause said pivoted elements to rotate simultaneously when one is actuated, and means engaging the sector for controlling its movement clockwise and counterclockwise to thereby raise and lower the seat supporting member.

2. A track for supporting one side of a seat for fore and aft and vertical adjustment, said track comprising a first member, two spaced pivoted elements supported by said member one near the front the other near the rear thereof, link means fixed to one of said elements, a toothed sector secured to the other of said elements, a seat supporting member secured to said link means and sector which is vertically adjusted thereby, arms fixed to said elements, a bar interconnecting said arms to cause said pivoted elements to rotate simultaneously when one is actuated, and means engaging the sector for controlling its movement clockwise and counterclockwise to thereby raise and lower the seat supporting member, said link means embodying a first link secured to said one element and a second link, said second link being pivoted to said seat supporting member and said first link to provide a floating connection therebetween.

3. A track for supporting one side of a seat for fore and aft and vertical adjustment, said track comprising a first member, two spaced pivoted elements supported by said member one near the front the other near the rear thereof, a link fixed to one of said elements, a toothed sector secured to the other of said elements, a seat supporting member secured to said link and sector which is vertically adjusted thereby, means interconnecting said pivoted elements to cause them to rotate in unison, and means engaging the sector for controlling its movement clockwise and counterclockwise to thereby raise and lower the seat supporting member.

4. A track for supporting one side of a seat for fore and aft and vertical adjustment, said track comprising a first member, two spaced pivoted elements supported by said member one near the front the other near the rear thereof, a link fixed to one of said elements, a toothed sector secured to the other of said elements, a seat supporting member secured to said link and sector which is vertically adjusted thereby, means interconnecting said pivoted elements to cause them to rotate in unison, means engaging the sector for controlling its movement clockwise and counterclockwise to thereby raise and lower the seat supporting member, a third member extending forwardly and rearwardly of said track, and longitudinally shiftable means interconnecting the third member to one of said other two members.

5. A track for supporting one side of a seat for fore and aft and vertical adjustment, said track comprising a first member, two spaced pivoted elements supported by said member one near the front the other near the rear thereof, a link fixed to one of said elements, a toothed sector secured to the other of said elements, a seat supporting member secured to said link and sector which is vertically adjusted thereby, means interconnecting said pivoted elements to cause them to rotate in unison, means engaging the sector for controlling its movement clockwise and counterclockwise to thereby raise and lower the seat supporting member, a third member extending forwardly and rearwardly of said track, longitudinally shiftable means interconnecting the third member to one of said other two members, and locking means for securing said longitudinal shiftable means to said one of said members in various positions of adjustment.

6. A track for supporting one side of a seat for fore and aft and vertical adjustment, said track comprising a first member, two spaced pivoted elements supported by said member one near the front the other near the rear thereof, a link fixed to one of said elements, a toothed sector secured to the other of said elements, a seat supporting member secured to said link and sector which is vertically adjusted thereby, means interconnecting said pivoted elements to cause them to rotate in unison, means engaging the sector for controlling its movement clockwise and counterclockwise to thereby raise and lower the seat supporting member, a second track for the opposite side of said seat which is similar to said first track, and means interconnecting one of the pivoted elements of each track to have all four of the pivoted elements rotated under the control of said one sector engaging means.

7. A track for supporting one side of a seat for fore and aft and vertical adjustment, said track comprising a first member, two spaced pivoted elements supported by said member one near the front the other near the rear thereof, a link fixed to one of said elements, a toothed sector secured to the other of said elements, a seat supporting member secured to said link and sector which is vertically adjusted thereby, means interconnecting said pivoted elements to cause them to rotate in unison, means engaging the sector for controlling its movement clockwise and counterclockwise to thereby raise and lower the seat supporting member, a second track for the opposite side of said seat which is similar to said first track, means interconnecting one of the pivoted elements of each track to have all four of the pivoted elements rotated under the control of said one sector engaging means, supporting means for said first members on which they are longitudinally shiftable, locking means for retaining said first members in longitudinally adjusted position, interconnecting means between the locking means of each track, and means on one of said tracks for actuating both of said locking means.

8. A track for supporting one side of a seat for fore and aft and vertical adjustment, said track comprising a first member, two spaced pivoted elements supported by said member one near the front the other near the rear thereof, a link fixed to one of said elements, a toothed sector secured to the other of said elements, a seat supporting member secured to said link and sector which is vertically adjusted thereby, means interconnecting said pivoted elements to cause them to rotate in unison, means engaging the sector for controlling its movement clockwise and counterclockwise to thereby raise and lower the seat supporting member, a second track for the opposite side of said seat which is similar to said first track, means interconnecting one of the pivoted elements of each track to have all four of the pivoted elements rotated under the control of said one sector engaging means, supporting means for said first members on which they are longitudinally shiftable, locking means for retaining said first members in longitudinally adjusted position, interconnecting means between the locking means of each track, means on one of said tracks for actuating both of said locking means, and a torsion bar interconnecting the first said members of each track for causing them to move in unison.

9. In a track element, a raisable and lowerable member, a support, a swingable link, a toothed sector, means pivoting said link and sector on said support and to said member, pawls on said member engaging the teeth of said sector for controlling the raising and lowering of said member, detents carried by said member for locking said sector in shifted position, and means for operating said pawls and detents in predetermined sequence for unlatching one of the detents while the associated pawl permits the change in the vertical position of the member in one direction.

10. In a track element, a raisable and lowerable member, a support, a swingable link, a toothed sector, means pivoting said link and sector on said support and to said member, pawls on said member engaging the teeth of said sector for controlling the raising and lowering of said member, detents carried by said member for locking said sector in shifted position, means for operating said pawls and detents in predetermined sequence for unlatching one of the detents while the associated pawl permits the change in the vertical position of the member in one direction, and spring actuated positioning means for retaining said pawl operating means in a neutral position.

11. In a track member for a seat, a base member, a longitudinally shiftable member, a pair of stub shafts pivotally supported on said shiftable member at opposite ends thereof, a link fixed to one end of one of said shafts, a sector fixed to one end of the other of said shafts, teeth on said sector, a seat supporting member to which the link and sector are pivotally secured, interconnecting means between said shafts to cause them to be rotated in unison, a ratchet mechanism pivoted to said seat supporting member embodying a pair of pawls and a pair of detents, said pawls and detents engaging said teeth and controlling the movement of said sector, means interconnecting the detents and pawls, and means for actuating said pawls and detents whereby when one of said pawls engages a tooth and moves said sector in one direction the associated detent has been released to permit such movement.

12. In a track member for a seat, a base member, a longitudinally shiftable member, a pair of stub shafts pivotally supported on said shiftable member at opposite ends thereof, a link fixed to one end of one of said shafts, a sector fixed to one end of the other of said shafts, teeth on said sector, a seat supporting member to which the link and sector are pivotally secured, interconnecting means between said shafts to cause them to be rotated in unison, a ratchet mechanism pivoted to said seat supporting member embodying a pair of pawls and a pair of detents, said pawls and detents engaging said teeth and controlling the movement of said sector, means interconnecting the detents and pawls, means for actuating said pawls and detents whereby when one of said pawls engages a tooth and moves said sector in one direction the associated detent has been released to permit such movement, a handle secured to said pawl actuating means and movable upwardly and downwardly, and means engaging said actuating means for retaining said handle substantially midway between its maximum distance of upward and downward movement.

13. In a track member for a seat, a base member, a longitudinally shiftable member, a pair of stub shafts pivotally supported on said shiftable member at opposite ends thereof, a link fixed to one end of one of said shafts, a sector fixed to one end of the other of said shafts, teeth on said sector, a seat supporting member to which the link and sector are pivotally secured, interconnecting means between said shafts to cause them to be rotated in unison, a ratchet mechanism pivoted to said seat supporting member embodying a pair of pawls and a pair of detents, said pawls and detents engaging said teeth and controlling the movement of said sector, means interconnecting the detents and pawls, means for actuating said pawls and detents whereby when one of said pawls engages a tooth and moves said sector in one direction the associated detent has been released to permit such movement, a handle secured to said pawl actuating means and movable upwardly and downwardly, means engaging said actuating means for retaining said handle substantially midway between its maximum distance of upward and downward movement, locking means on said base member for securing said longitudinally shiftable member in adjusted position, and means carried by said shiftable member for actuating said locking means.

14. In a track member for a seat, a base member, a longitudinally shiftable member secured to said base member, a link, a toothed sector, a seat supporting member, means for pivoting said link and said sector to said shiftable member and said seat supporting member, means interconnecting said link and sector to cause them to operate in unison, and teeth engaging means carried by one of said members for adjusting said sector and securing it in adjusted position through the engagement of said teeth.

15. In a track member for a seat, a base member, a longitudinally shiftable member secured to said base member, a link, a toothed sector, a seat supporting member, means for pivoting said link and said sector to said shiftable member and said seat supporting member, means interconnecting said link and sector to cause them to operate in unison, teeth engaging means carried by one of said members for adjusting said sector and securing it in adjusted position through the engagement of said teeth, a handle on said teeth engaging means, and means for positioning the handle substantially midway between its maximum position of upward and downward movement.

16. In a seat track, a first member, a link, a toothed sector, a seat supporting member, means pivotally securing said link and sector to said members, means interconnecting the link and sector to cause them to operate in unison, pawl means, detent means, said pawl means and detent means engaging said teeth for controlling the rotative position of the sector and the vertical position of said seat supporting member, and interconnecting means between said pawl means and detent means which causes the detent means to be released when the pawl means is actuated.

17. In a seat track, a first member, a link, a toothed sector, a seat supporting member, means pivotally securing said link and sector to said members, means interconnecting the link and sector to cause them to operate in unison, pawl means, detent means, said pawl means and detent means engaging said teeth for controlling the rotative position of the sector and the vertical position of said seat supporting member, interconnecting means between said pawl means and detent means which causes the detent means to be released when the pawl means is actuated, and longitudinally shiftable means secured to one of said members.

References Cited in the file of this patent

UNITED STATES PATENTS

| | | |
|---|---|---|
| 2,071,032 | Grinnell | Feb. 16, 1937 |
| 2,091,899 | Whedon et al. | Aug. 31, 1937 |
| 2,101,350 | Simpson et al. | Dec. 7, 1937 |
| 2,345,182 | Corber | Mar. 28, 1944 |
| 2,527,111 | Widrich | Oct. 24, 1950 |
| 2,596,033 | King | May 6, 1952 |
| 2,620,489 | Holm | Dec. 8, 1952 |
| 2,630,159 | Fifield | Mar. 3, 1953 |